United States Patent
Liu et al.

(10) Patent No.: US 7,031,051 B2
(45) Date of Patent: Apr. 18, 2006

(54) DUAL FIBER OPTIC AMPLIFIER WITH SHARED PUMP SOURCE

(75) Inventors: Jian Liu, Sunnyvale, CA (US); Zheng Wang, San Jose, CA (US); Yonglin Huang, Milpitas, CA (US); Xuejun Lu, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 389 days.

(21) Appl. No.: 10/384,228

(22) Filed: Mar. 7, 2003

(65) Prior Publication Data

US 2004/0085624 A1 May 6, 2004

Related U.S. Application Data (60) Provisional application No. 60/422,599, filed on Oct. 31, 2002.

(51) Int. Cl.
*H04B 10/12* (2006.01)

(52) U.S. Cl. .............. 359/341.2; 359/341.32; 398/135

(58) Field of Classification Search ........... 359/341.3, 359/341.32, 341.2, 135
See application file for complete search history.

(56) References Cited

U.S. PATENT DOCUMENTS

| | | | | |
|---|---|---|---|---|
| 5,956,168 A | * | 9/1999 | Levinson et al. | 398/41 |
| 6,381,065 B1 | * | 4/2002 | Homsey | 359/341.32 |
| 6,580,552 B1 | * | 6/2003 | Welch | 359/341.32 |

* cited by examiner

*Primary Examiner*—Mark Hellner
(74) *Attorney, Agent, or Firm*—Workman Nydegger (57) ABSTRACT

A dual fiber optic amplifier uses a single pump source for two or more optical power amplifiers. The dual fiber optic amplifier includes a pump source that emits light, a pump splitter, a first optical power amplifier and a second optical power amplifier. The pump splitter splits the light emitted by the pump source into two or more portions. The first optical power amplifier includes an optical fiber input, an optical fiber output, and a doped fiber portion, wherein the first portion of light from the splitter is coupled into the optical fiber input of the first optical power amplifier. The second optical power amplifier includes an optical fiber input, an optical fiber output, and a doped fiber portion, wherein the second portion of light emitted from the splitter is coupled into the optical fiber input of the second optical power amplifier.

26 Claims, 6 Drawing Sheets

FIG. 3A (Pre-amplifier at 40 mW pump power)

FIG. 3B (Power amplifier at 120 mW pump power)

DUAL FIBER OPTIC AMPLIFIER WITH SHARED PUMP SOURCE

This application claims the benefit of Provisional App. No. 60/422,599, filed Oct. 31, 2002.

The present invention relates generally to a system for pumping optical energy into doped fiber optical amplifiers, and particularly to a system using a single pump source to provide optical energy to more than one doped fiber optical amplifier.

BACKGROUND OF THE INVENTION

Fiber optic communication utilizes optical transmitters, optical receivers and optical fiber, among other components, to transmit light signals through the fiber. The transmitters and receivers are often integrated into a single component called a transceiver. Transmitters are light sources, such as lasers or light-emitting diodes. Receivers usually include a photo detector.

A signal being transmitted through a fiber optic system may suffer amplitude attenuation due to energy absorption, beam scattering and other processes during transmission. To compensate for such signal loss during transmission, optical amplification may be used to increase the amplitude of the signal leaving the transmitters or to increase the amplitude of a signal coming in to the receivers. An amplifier placed after the transmitter to boost an outgoing signal is often called a power amplifier, and an amplifier placed before the receiver to boost an incoming signal is often called a pre-amplifier. Passive optical amplifiers, such as erbium doped fiber amplifiers (EDFA), are often used for such amplification.

Doped fiber amplifiers typically include a length of optical fiber that has been doped with certain elements. Such amplifiers amplify a transmission signal when the doped fiber receives optical energy from a pump source. Such amplifiers produce amplification by stimulated emission—the dopants in the doped fiber are stimulated to a higher energy state by receiving pump power and may achieve a population inversion. As energy falls back to lower energy levels additional photons may be emitted. Usually the doped fiber responds most efficiently to one or more pumping wavelengths. In other words, the amplification imparted to the transmission signal may have a gain curve with one or more peaks corresponding to wavelengths specific to that amplifier. A pump source is often chosen based on the peak gain wavelength of the doped fiber amplifier.

Conventionally, the pump sources for the power amplifiers and pre-amplifiers are separate and individual. Thus, one separate pump source is used for the power amplifier, and one separate pump source is used for the pre-amplifier. Often, a pre-amplifier requires less pump power than a power amplifier, as the pre-amplifier is intended to produce less gain. The cost of the pump sources is often a significant part of the total cost of the amplifiers. For example, in a typical power amplifier or pre-amplifier, the cost for its associated pump source can be 60–80% of the total cost.

Both long distance and metro area telecommunications systems employ systems which include optical fiber, transceivers and amplifiers. However, metropolitan area networks (MANs) tend to have shorter distances between transceivers and are more cost sensitive than long distance telecommunications systems. As such, the considerable expense of multiple pump sources is relatively more significant for metropolitan area networks.

SUMMARY OF THE INVENTION

In summary, the present invention is a dual fiber optic amplifier using a single pump source to provide power to two or more optical power amplifiers. The dual fiber optic amplifier includes a pump source that emits light, a pump splitter, a first optical power amplifier and a second optical power amplifier. The pump splitter splits the light emitted by the pump source into two or more portions, with a first portion directed to the first optical power amplifier and a second portion directed in the second optical power amplifier. The first optical power amplifier includes an optical fiber input, an optical fiber output, and a doped fiber portion. The first portion of light emitted from the pump splitter is coupled into the optical fiber input of the first optical power amplifier. The second optical power amplifier includes an optical fiber input, an optical fiber output, and a doped fiber portion. The second portion of light emitted from the pump splitter is coupled into the optical fiber input of the second optical power amplifier.

A further embodiment of the present invention is an optoelectronic transceiver that includes an optical signal transmitter, an optical signal receiver, a pump source that emits light, a pump splitter, a first optical power amplifier, and a second optical power amplifier. The first optical power amplifier includes an optical fiber input coupled to an output of the optical signal transmitter, an optical fiber output, and a doped fiber portion. A first portion of the light emitted from the pump splitter is coupled into the optical fiber input of the first optical power amplifier. The second optical power amplifier includes an optical fiber input, an optical fiber output coupled to an input of the optical signal receiver, and a doped fiber portion. A second portion of light emitted from the pump splitter is coupled into the optical fiber input of the second optical power amplifier. In an embodiment comprising an integrated transceiver and dual fiber optic amplifier package, the optical power amplifier coupled to the transmitter output is a "power amplifier", and the optical power amplifier coupled to the receiver input is a "pre-amplifier."

In some embodiments, the pump splitter splits the pump source light in unequal portions, such that the first and second optical power amplifiers receive portions of pump light having different amplitudes.

By cutting the number of pump sources in half, the total cost of the power amplifier and pre-amplifier associated with a transceiver is significantly lowered. Replacing two pump sources with one also typically reduces the total power used by the amplifiers in the transceiver, and enables the transceiver to be placed in a smaller housing. Thus, it is highly desirable to use one pump source for both the power amplifier and pre-amplifier.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
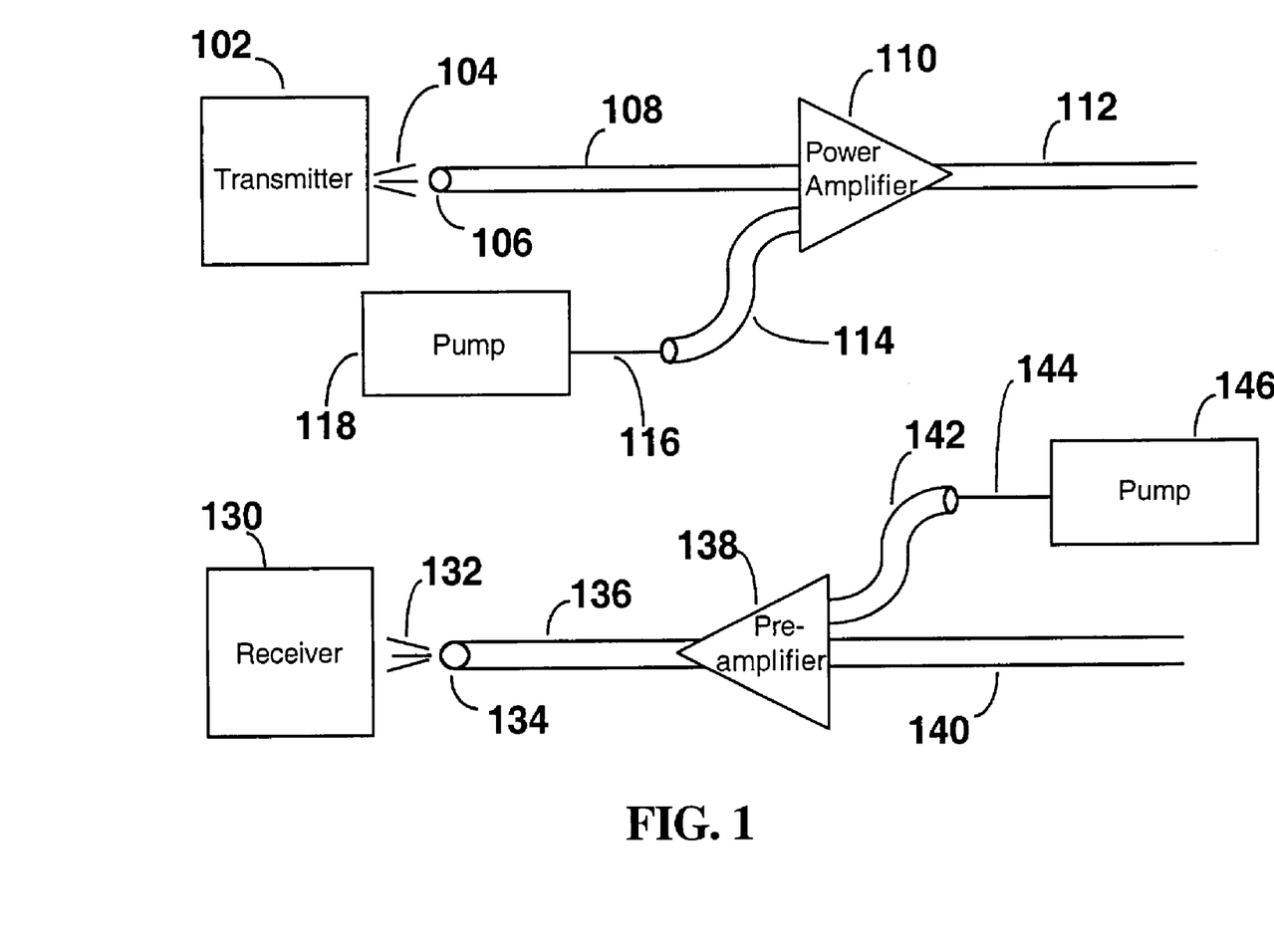
FIG. 1 is a block diagram of a transceiver having a pair of optical amplifiers.

Referring to FIG. 1, there is shown an example of the conventional approach to multiple optical power amplifiers used in conjunction with transceivers or a set of transmitters and receivers that are relatively close to each other. Two separate pump sources 118, 146 are used—one for each of the optical power amplifiers 110, 138. The two optical power amplifiers are a power amplifier 110 and a pre-amplifier 138.

Each of the optical power amplifiers 110, 138 is a doped fiber amplifier that includes a length of optical fiber that has been doped with certain elements. Such amplifiers amplify an optical signal, if the signal is within a particular wavelength range, when the doped fiber receives optical energy from a pump source. Such amplifiers produce amplification by stimulated emission—the dopants in the doped fiber are stimulated to a higher energy state by receiving pump power and may achieve a population inversion. As energy falls back to lower energy levels additional photons may be emitted.

In this example, FIG. 1 shows a transmitter 102 transmitting an optical signal 104 into an optical fiber 108. The optical fiber 108 is coupled to a power amplifier 110 to amplify the transmission signal before it is transmitted to an output fiber 112. The power amplifier 110 receives optical pump energy (i.e., light) from the pump source 118. The power amplifier 110 includes a doped fiber portion that amplifies light within a particular range of transmission wavelengths when the doped fiber is pumped by a pump source of light within another range of wavelengths. The pump source emits a beam of light 116 into an optical fiber 114 which is coupled into the power amplifier 110.

In close proximity to the transmitter 102 and power amplifier 110, a receiver 130 and pre-amplifier 138 are similarly equipped. Specifically, the receiver 130 receives an optical signal 132 from the end 134 of an optical fiber 136. The optical fiber 136 is the output for a pre-amplifier 138 which amplifies an incoming signal from optical fiber 140. The preamplifier 138 receives optical pump energy (i.e., light) from the pump source 146. The pump source emits a beam of light 144 into an optical fiber 142 which is coupled into the power amplifier 138.

In this way, both transmitted and received signals may be amplified by their respective amplifiers (power amplifiers or pre-amplifiers) and separate pump sources. The separate pump sources typically generate light at the same or similar wavelengths, especially where the optical power amplifiers 110, 138 use doped fiber amplifiers with similar gain characteristics, such as erbium doped fibers. However, power amplifiers and pre-amplifiers often require different amounts of pump energy.

Figure 2:
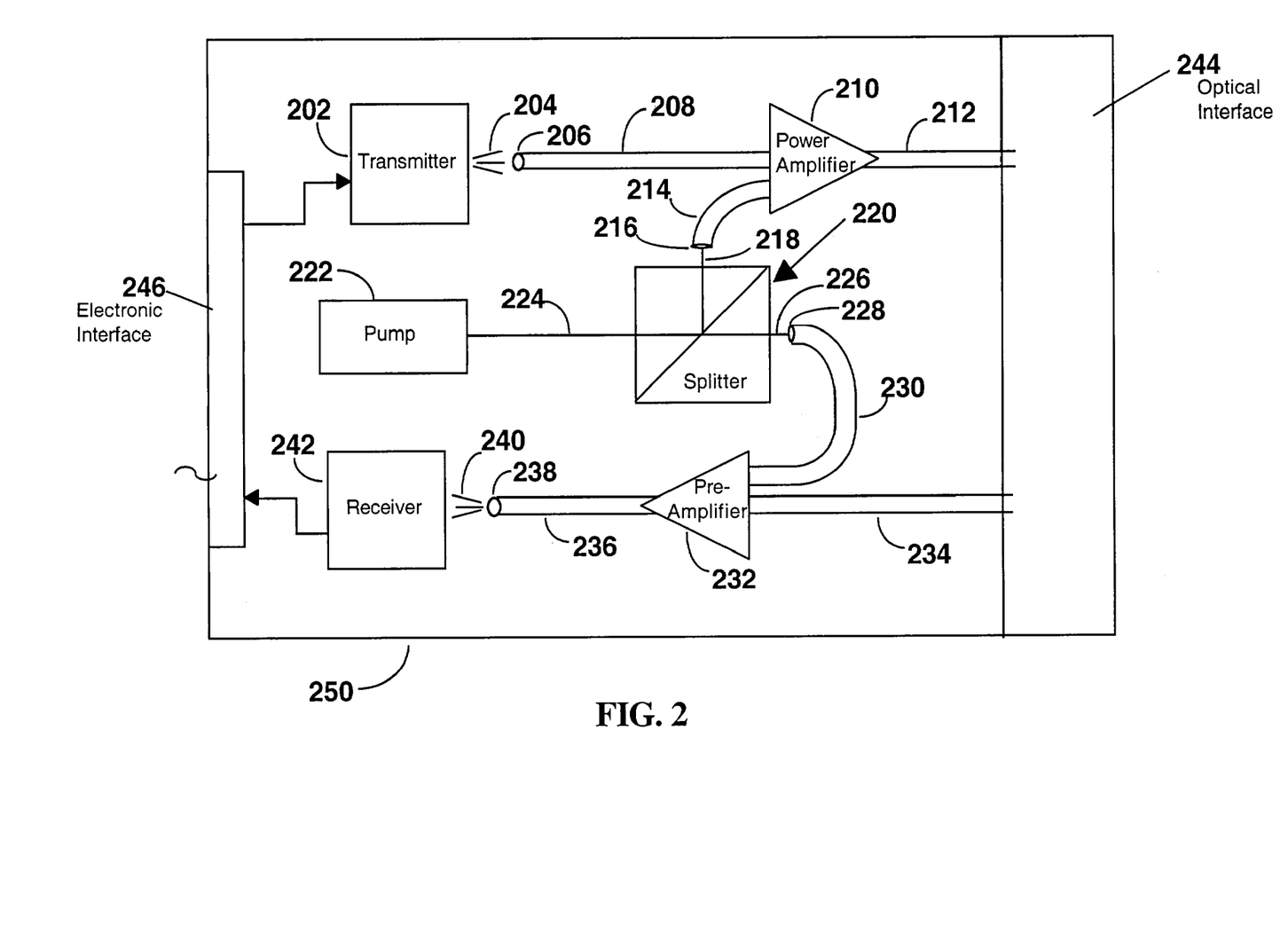
FIG. 2 is a conceptual block diagram of a dual fiber optic amplifier system.

FIG. 2 shows a conceptualized representation of a transceiver 250 that includes a dual fiber optic amplifier according to an embodiment of the present invention. In contrast to the conventional approach depicted in FIG. 1 above (i.e., discrete and separate pump sources for each amplifier), one pump source 222 is used in an embodiment of the present invention to pump more than one optical power amplifier. As shown in FIG. 2, the two optical power amplifiers 210, 232 are a power amplifier and a pre-amplifier, respectively. An optical splitter 220 divides the light output by the pump source 222, with a first portion of the light being directed by the splitter 220 to the power amplifier 210 and a second portion of the light being directed to the pre-amplifier 232. Different amounts of light may be directed by the splitter 220 to each of the optical amplifiers, with the ratio of light directed to each being set in accordance with the power needs of each of the amplifiers 210, 232.

The pump source and splitter arrangement of FIG. 2 may also be used with systems having multiple power amplifiers or multiple pre-amplifiers. Also, in some embodiments the dual doped fiber amplifier is a separate device from the transmitter 202 and receiver 242, but coupled thereto as an add-on component.

The transceiver 250 usually includes a transmitter 202 and a receiver 242 packaged together with the pump 222 and splitter 220. The transceiver has an electrical interface 246 to receive electrical power, control signals and an input data stream for the coupling to the transmitter 202. The electrical interface 246 also conveys an output data stream from the receiver 242 to a host device (not shown). On optical interface 244 connects a pair of fiber optic cables to the transceiver. On the transmitter side, an optical transmission signal 204 is transmitted from the transmitter 202 into a fiber optic cable 208. A power amplifier 210 amplifies the optical transmission signal. The power amplifier 210 is preferably a doped fiber amplifier, which requires an optical pump to produce the amplification of the optical transmission signal. The optical transmission signal 204 has a first wavelength (e.g., 1550 nm) that is within a predefined range of wavelengths (e.g., 1535 to 1560 nm) of light that are amplified (by stimulated emission) by the doped fiber amplifier 210 when the doped fiber amplifier is pumped with optical energy at a second wavelength to which the dopant in the doped fiber amplifier responds.

On the receiver side, an optical signal 240 being received from a fiber optic cable 234/236 is passed through a pre-amplifier 232 to amplify the incoming signal before receipt at the receiver 242. The pre-amplifier 232 is also be a doped fiber amplifier requiring optical pumping to produce amplification of the received signal. The pre-amplifier 232 has a doped fiber portion that amplifies the received signal 204 when the pre-amplifier 232 is pumped with light at a wavelength (e.g., 980 nm) at which the dopant in the doped fiber responds with stimulated emission.

The optical pumping for both the power amplifier 202 and the power amplifier 232 is provided by a single optical pump source 222. This is accomplished by splitting the pump beam 224 into two or more portions. An exemplary splitter 220 splits the pump beam 224 into two portions 218 and 226. These portions may be of equal or unequal amplitudes. Typically, a smaller portion of the optical pump power will be directed to the pre-amplifier 232 than the portion directed to the power amplifier 210. Each portion of light from the splitter 220 is coupled either directly or via a fiber optic cable into the power amplifier 210 and pre-amplifier 232. Specifically, a first portion of light 218 may be coupled into a fiber 214 that in turn is coupled into the power amplifier 210. This allows the first portion of light 218 to pump the power amplifier 210 and thereby amplify the transmission signal before it is transmitted into an optical system via fiber cable 212 and optical interface 244. The second portion 226 of light from the splitter 220 may be coupled into a fiber 230 that in turn is coupled into the pre-amplifier 232. In this way the second portion of light 226 is used to pump the pre-amplifier 232 and thereby amplify the signal being received by the receiver 242.

The transceiver 250 preferably includes a housing (represented by the transceiver's outside border shown in FIG. 2) that provides electromagnetic shielding, to reduce EMI emissions from the transceiver 250.

The necessity for amplification in optical transceiver systems can be seen, for example, when a 3 decibel (dB) coupler is used to multiplex different wavelengths into a single strand of an optical fiber. Loss caused by the 3 dB coupler will accumulate as the channel count increases. A power amplifier may then be needed to compensate these losses and to maintain adequate power into the transmission line. In addition, after transmission through the system, optical signals may be significantly weakened due to the transmission span loss. A pre-amplifier may then be employed to amplify the incoming signals to a level within the sensitivity of the receivers.

Figure 3A:
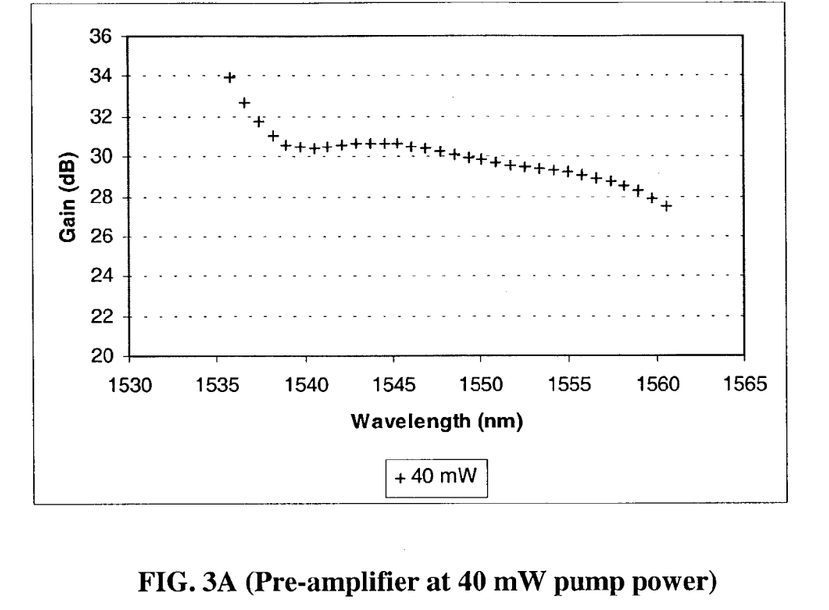
FIG. 3A is a graph of a gain curve for an exemplary optical amplifier.
Figure 3B:
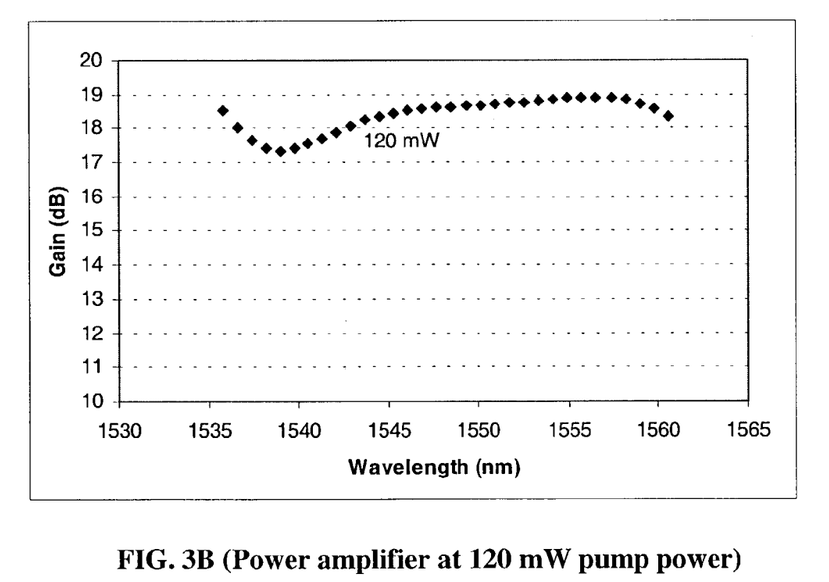
FIG. 3B is a graph of a gain curve for an exemplary optical pre-amplifier.

FIGS. 3A and 3B show gain curves for an exemplary pre-amplifier and an exemplary power amplifier. Both gain curves are for erbium doped fiber amplifiers, and show the gain in decibels (dB) as a function of wavelength in nanometers (nm). These gain curves are provided as examples of the gain characteristics and pump power requirements of typical preamplifiers and power amplifiers. To demonstrate an application of dual fiber optic amplifiers with a shared pump source, a simulation is shown in FIGS. 3A and 3B of the performance of pre-amplifiers and power amplifiers for a 32-channel wave division multiplexing (WDM) system. A 40 milliwatt (mW) pump power is applied to a pre-amplifier, and a 120 mW pump power is applied to a power amplifier. This is done by splitting a 160 mW pump power utilizing a 25%/75% pump splitter, such that the pre-amplifier then receives 25% (or 40 mW) of the total pump power, while the power amplifier receives the remainder of the total (75% or 120 mW).

Power amplifiers and pre-amplifiers generally receive differing amounts of optical pump energy and are often designed differently. Power amplifiers often amplify signals at a higher signal level than pre-amplifiers. Stated another way, pre-amplifiers are often used to amplify much smaller signal levels than power amplifiers. Nevertheless, it is possible to use the same or similar designs for both types of amplifiers. When doped fiber amplifiers are used for either power amplifiers or pre-amplifiers, parameters for the design and use of such amplifiers include pump power, signal input power, doping levels and length of the doped fiber portions. These are the parameters that impact the gain curves shown in FIGS. 3A and 3B. While erbium doped fiber amplifiers are often used, other dopant elements may be used in other embodiments of the present invention.

Gain is defined here as follows:

$$\text{Gain} = 10 * \log_{10} (\text{power out/power in})$$

where "power out" is a power measurement of the transmission power of a signal output by an amplifier, and "power in" is a power measurement of a signal input to that amplifier.

FIG. 3A shows the gain curve of an erbium doped pre-amplifier receiving 40 mW of pump power. The gain curve is relatively flat for wavelengths between about 1535 nm and 1560 nm. This range of wavelengths coincides with the wavelengths at which optical telecommunications signals are often transmitted. The fact that the gain curve is relatively flat is important for systems in which optical signals are transmitted at several wavelengths, as in wave division multiplexing (WDM) systems. The gain curve is not exactly flat or uniform though, and thus different wavelengths may receive different gain amplitudes, which may require gain equalization (see discussion of Gain Equalization Filters (GEF) below).

FIG. 3B shows the gain curve of an erbium doped power amplifier receiving 120 mW of pump power. The gain curve is also relatively flat in the range of approximately 1535 nm to 1560 nm. Again, optical telecommunication signals are often within this wavelength range. Pre-amplifiers may require gain equalization for reasons similar to those stated above for power amplifiers.

The results in this example show greater than 25 dB gain for the pre-amplifier (input signal −40 dBm/channel) and greater than 16 dB gain for the power amplifier (input signal −15 dBm/channel).

Figure 4:
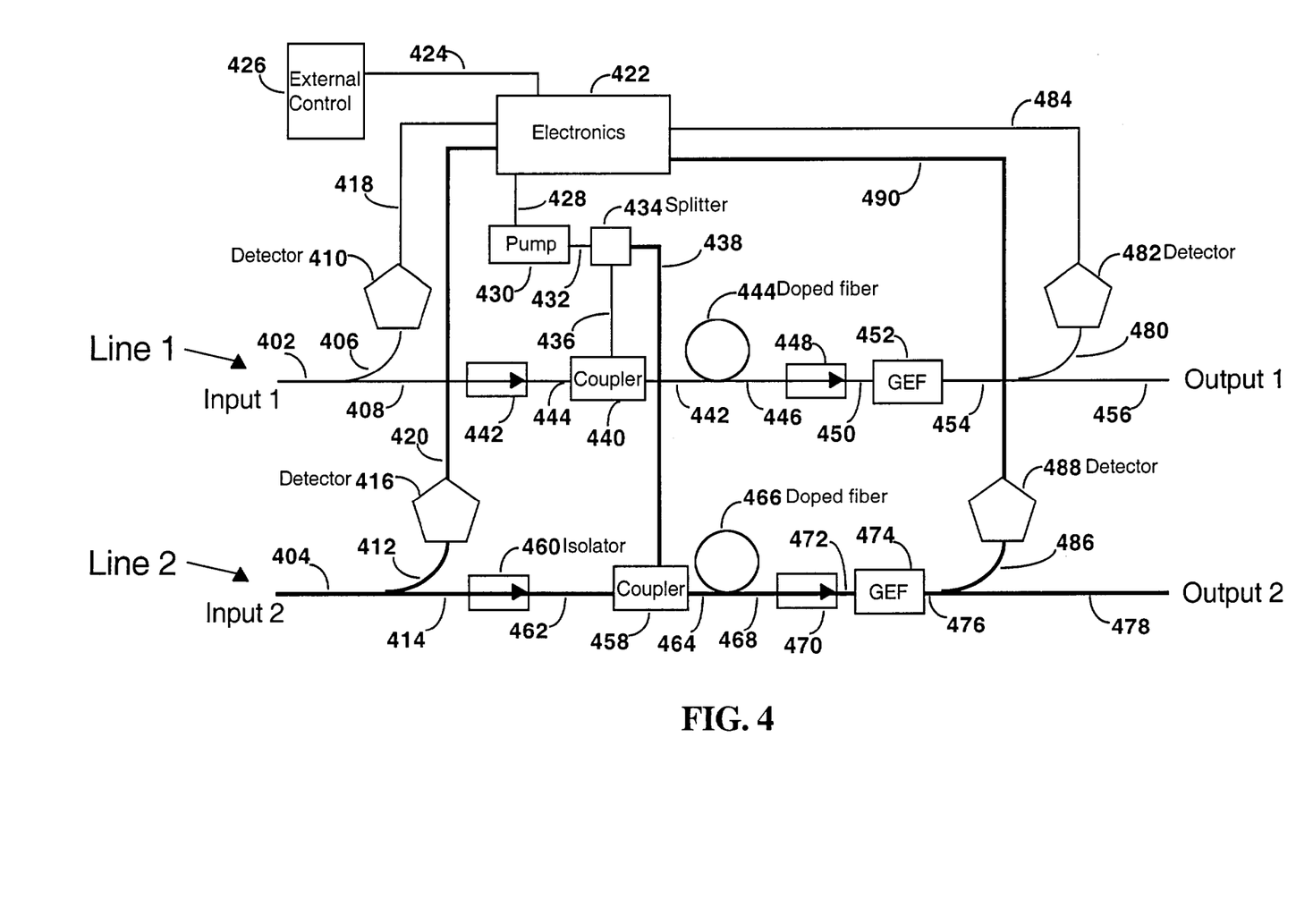
FIG. 4 is a diagram of a duplex optical amplifier system in accordance with a first embodiment.

FIG. 4 shows a first embodiment of the present invention. FIG. 4 provides a more detailed view of an embodiment building on the conceptualized view of FIG. 2. FIG. 4 shows two fiber optic lines (straight line shown between Input 1 to Output 1, and straight line shown between Input 2 to Output 2, respectively). Each line has similar accompanying components, including one or more of each of the following: optical detectors, isolators, couplers, doped fiber amplifiers and gain equalization filters (GEF). A single pump source 430 plus a splitter 434 allows the single pump to pump two or more doped fiber amplifiers 444, 466 to amplify the signals passing through the two fiber optic lines. It should be noted that the two lines, while shown as essentially identical in FIG. 4, do not have to be identical and may include different components.

Starting with Line 1 (i.e., represented by the straight line between Input 1 and Output 1), fiber optic cable 402 carries one or more optical signals from Input 1. These may be signals being transmitted from a transmitter or coming in to a receiver. A portion of the incoming signal may be split or tapped into fiber 406. This splitting may be done by a beam splitter, thin film or other optical splitting mechanism. Fiber 406 is coupled to an optical detector 410. This detector 410 is used to detect signals transmitted from Input 1 into the amplifier system via fiber 408 through to Output 1. Upon detecting one or more signals, detector 410 provides an electrical signal to an electronics subsystem 422. The electronics 422 includes logic to perform various operations on detected signals from one or more detectors in the system (see later discussion of various electronics configurations). The electronics 422 may be responsive to an external control 426 to control various electronic operations manually or automatically. One electronic operation is control of the electrical power supplied to the pump source 430. The electrical power supplied to the pump source 430 may be varied to control the optical power emitted by the pump source 430. The system may also operate absent such electronics 422 or external control 426, by setting the power supplied to the pump source 430 to a fixed amount.

Line 2 (i.e., represented by the bold straight line between Input 2 and Output 2) may include a similar detector configuration as that described above. Line 2 receives one or more signals at Input 2 via fiber optic cable 404. A portion of this signal is split or tapped (via various beam splitting techniques) into fiber 412 to be transmitted to detector 416. If a signal is present in fiber 412, detector 416 detects it and signals such detection to the electronics 422. The electronics 422 and logic therein use the detection signals from one or more detectors 410, 416 (and/or others) separately or in combination to control the electrical power applied to the pump source 430.

The portions of the input signals not diverted into fibers 406 and 412 continue into the amplification system. Specifically, the transmitted portion of Line 1 continues on fiber 408, and the transmitted portion of Line 2 continues on fiber 414. Each line preferably passes through an optical isolator in order to limit signals from being reflected back into the inputs. Specifically, isolator 442 blocks any light reflected from components downstream in the system of Line 1. Similarly, isolator 460 blocks reflections from downstream components in Line 2. Such isolators may include Faraday rotators, thin films or various polarization systems, among other optical isolators.

A pump beam is inserted into the same fiber 444/442 that carries the optical signal transmitted through isolator 442. The pump beam is carried via fiber optic cable 436 from a splitter 434. The single pump source 430 has its emitted light split by the splitter 434 into one or more portions of pump light. As discussed above, the resulting portions of the pump light may be of equal amplitude or unequal amplitude. In a preferred embodiment, the splitter 434 is configured to deliver about 75% of the pump light to coupler 440 via optical fiber 436, and about 25% of the pump light to coupled 458 via line 438. The splitter 434 may include thin films, diffraction gratings, polarizers or other light beam splitting mechanisms.

In a preferred embodiment, the couplers 440 and 458 are wave division multiplexing couplers. Each coupler may include thin films or fused-fibers, and is used for coupling two or more beams of light from several optic fibers. In this way the optical transmission signal from fiber 444 and the pump light from fiber 436 are combined into fiber 442. Similarly, pump light is combined by coupler 458 with a signal transmitted through isolator 460, down Line 2 and into fiber 462. Usually the transmission signal will have a higher wavelength than that of the pump light from the pump source. More generally, the pump source is selected to have a wavelength that enables amplification of the transmission signal by the doped fiber amplifier. For example, a typical system incorporating the present invention uses a transmission signal in a range of about 1530 to 1560 nm, and pump light having a wavelength of about 980 nanometers.

The pump light coupled into lines 1 and 2 travels with the transmitted signals. The pump light then pumps the doped fiber amplifiers (444 and 466, respectively), thereby amplifying the respective transmission signals also traveling through the doped fiber amplifiers as discussed above in relation to FIGS. 1–3.

An isolator (448 for Line 1; 470 for Line 2, respectively) may be included in a transmission line after the doped fiber amplifier. Such an isolator may be included in order to limit or block any reflected light from further downstream in the system from returning into the doped fiber amplifier. Such reflections may be detrimental to the operation of a doped fiber amplifier. For instance, reflected light allowed to bounce back and forth through the doped fiber amplifier may in effect cause the doped fiber to become a laser. Additionally, among other negative features, this may cause unwanted saturation of the doped fiber with a consequent reduction in the intended amplification of a transmission passing through the doped fiber amplifier.

In some embodiments, a gain equalization filter (GEF) 452, 474 is included in one or both of the optical fiber lines (line 1 and line 2, respectively) after the doped fiber amplifier. GEFs 452, 474 may include thin film or diffraction grating mechanisms, among others, and are usually unidirectional. GEFs are used to equalize or flatten the gain curve over a predefined range of wavelengths. Equalizing optical power gain reduces differences in power gain across wavelengths that may occur in an optical amplifier without GEF. As shown by way of example in FIGS. 3A and 3B above, the gain curve (as a function of wavelength) of a doped fiber pre- or power-amplifier is often not uniform. In order to get a more uniform gain across the intended transmission wavelengths, a GEF is employed to flatten the gain curve by attenuating the wavelenghts having the highest gain. This is especially important for use with pre-amplifiers in order to help improve operation of the corresponding receivers.

After passage through a doped fiber amplifier (444 and 446), with or without isolators (448 and 470, respectively) and GEFs (452 and 474, respectively), the now-amplified transmission signals continue through their corresponding lines (Line 1 and Line 2, respectively) through Output 1 and Output 2. In the embodiment shown in FIG. 4, transmission signals from Line 1 exit a GEF 452 via fiber cable 454. A portion of the transmission signal may be tapped or split from the direct line (i.e. continuing from fiber 454 through fiber 456 to Output 1). The split or tap may include a thin film or diffraction grating to divide portions of the transmission signal. A portion of the transmission signal may then be transmitted via fiber cable 480 to one or more detectors 482. Similarly for Line 2, a portion of the transmission signal exiting GEF 474 may be split into fiber 486 to be transmitted to one or more detectors 486. These secondary detectors may be coupled to electronics 422 via electrical connection 484.

The electronics 422 includes circuitry for performing predefined operations on detected signals from the detectors in the system. For example, electronics 422 are used in conjunction with detector 482 to measure the transmission signal level in Output 1, or more simply to determine whether the signal doped fiber amplifier 444 on Line 1 is equal to or exceeds a predefined threshold level. The electronics 422 is preferably configured to control the amount of power supplied to pump source 430 in accordance with the measurements made by the signal detectors and electronics 422. In some embodiments, electronics 422 measures the gain across each amplifier by comparing the measured input signal at detector 410 or 416 to the measured output signal at detector 482 or 488. Electronics 422 may be configured to adjust the power to the pump 430 if the measured gain is lower than a first predefined threshold level or above a second predefined level. In other embodiments, electronics 422 is configured to perform additional control and monitoring functions.

In embodiments of the system depicted in FIG. 4, the pump source 430 may be employed with or without cooling. In other words, cooled or uncooled pumps may be used as the pump source 430. The temperature of the pump source, especially for pump lasers, is important, as it may impact the operation of the pump source over time. It may also impact other nearby components. In either cooled or uncooled systems, the power supplied to the pump source 430 may be altered to control the optical pump power out of the pump source and the resultant amplification of the doped fiber amplifiers being pumped. For cooled pumps, additional electronics 422 may be used in order to control the cooling of the pump source—to hold the pump temperature at a set temperature or within a set range of temperatures.

Figure 5:
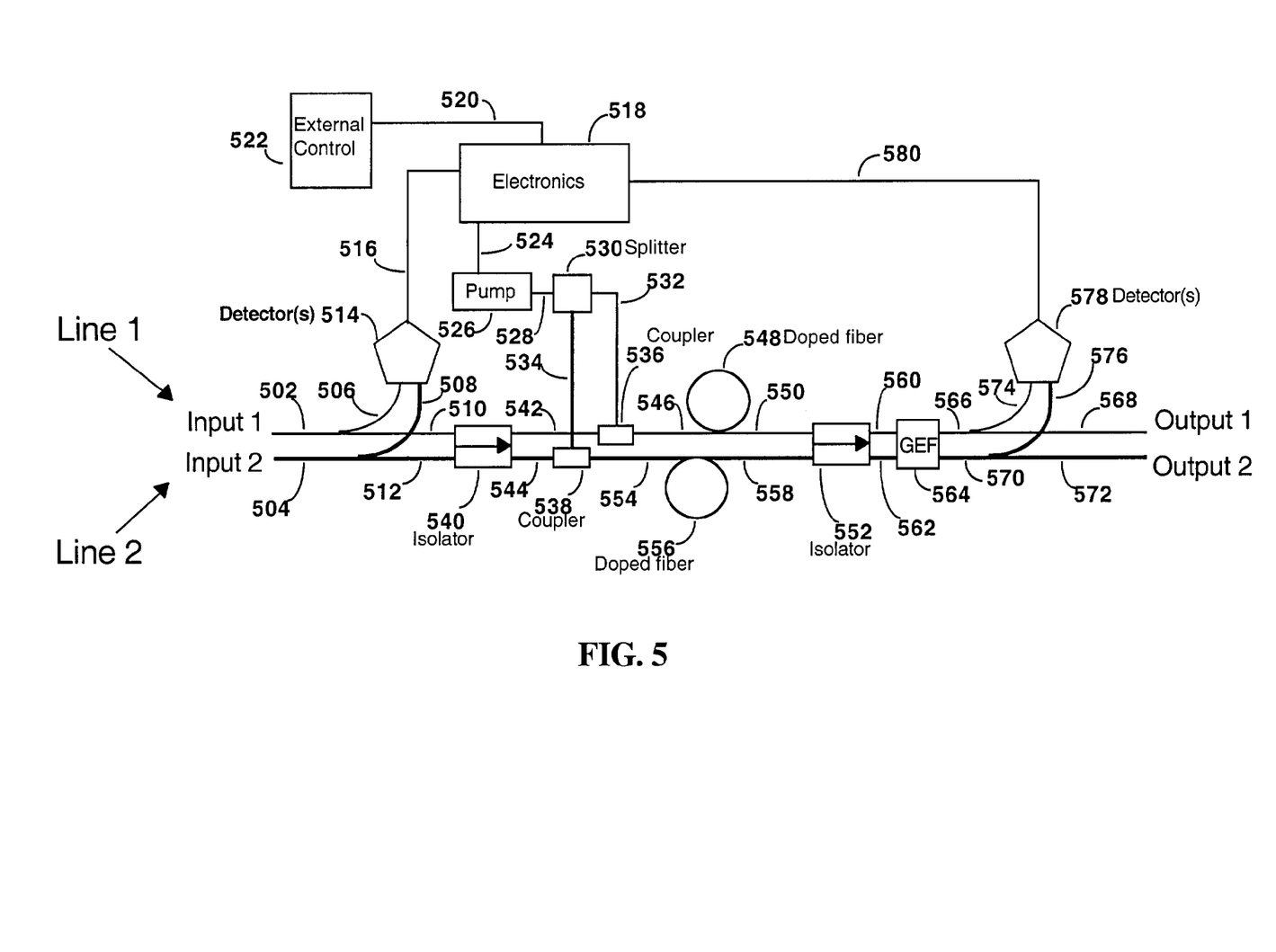
FIG. 5 is a diagram of an integrated duplex optical amplifier system in accordance with a second embodiment.

FIG. 5 shows a second embodiment of the present invention. This embodiment includes a more integrated approach to the system depicted in FIG. 4 and described above. This second embodiment also uses a single pump source 526 to optically pump multiple doped fiber amplifiers for amplifying transmitted or received signals over one or more wavelengths. Only those apsects of the second embodiment that differ from the embodiment shown in FIG. 4 will be described. Further, other embodiments may use some aspects of the embodiment of FIG. 4 and other aspects of the embodiment of FIG. 5.

The system of FIG. 5 differs from that of FIG. 4 in its use of a number of dual-line components to reduce the number of components in the system and to reduce the size of the amplifier system. The dual-line components include dual-line optical isolators 540, 552, and a single, dual-line GEF 564. These dual-line components have dual input pigtail connections and dual output pigtail connections. The two paths through these components may share optical subcomponents. The embodiment shown in FIG. 5 also differs from the first embodiment in its use of integrated detectors (514 and 578), each of which receives two input signals.

The dual-line GEF 564 may include thin film or diffraction grating mechanisms, among others. In this embodiment, GEF 564 receives signals from the outputs of both amplifiers (548 and 556). Similar to the first embodiment, separate couplers (536 and 538) and separate doped fiber portions (548 and 556) are be employed to maintain different pumping and amplification levels for the two Lines.

Figure 6:
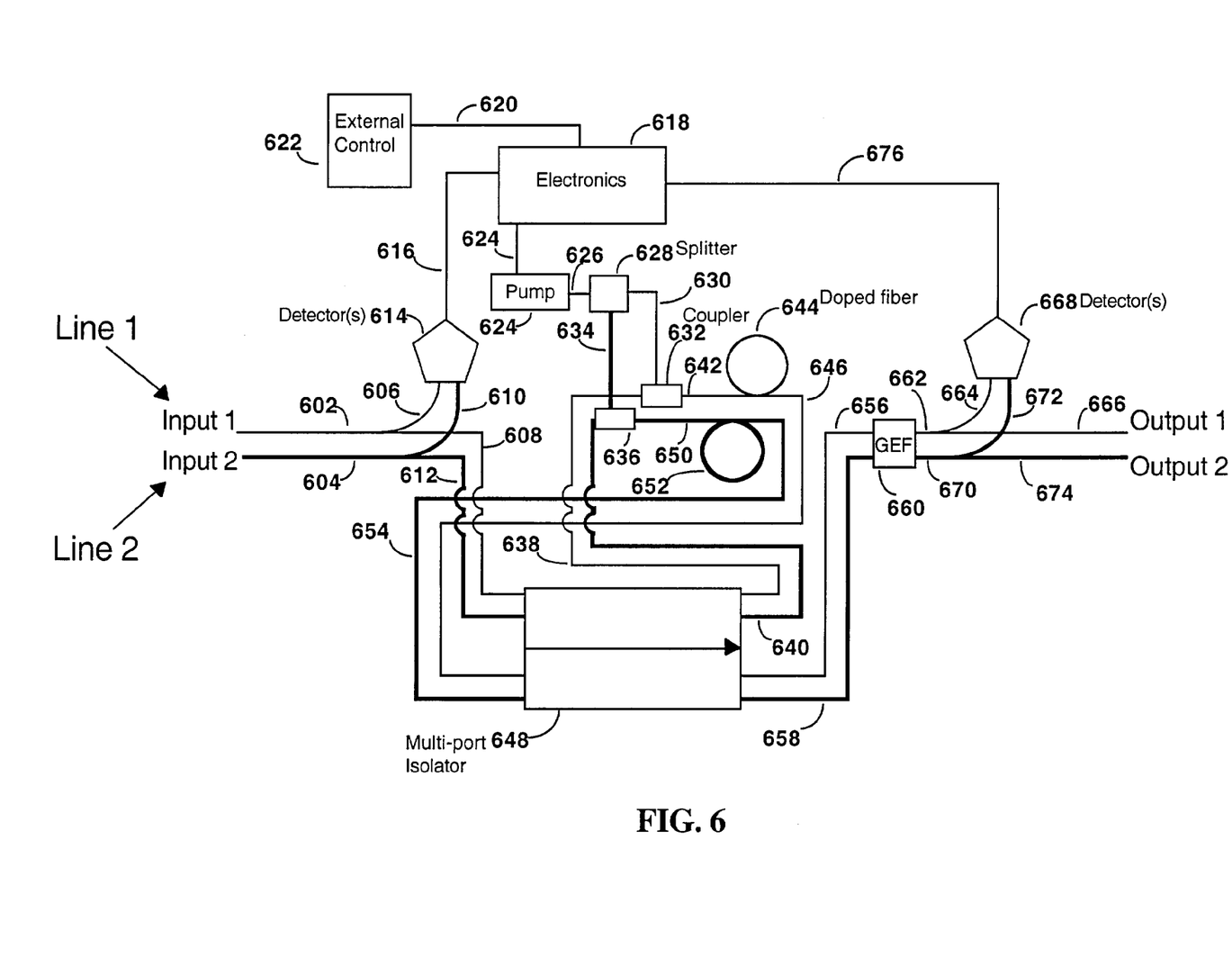
FIG. 6 is a diagram of an integrated duplex optical amplifier system including a multi-port isolator in accordance with a third embodiment.

FIG. 6 shows a third embodiment of the present invention. This embodiment shows a more integrated approach to the systems described above. A multiport isolator array 648 is the primary addition to the second embodiment shown in FIG. 5. A 4-way multiport isolator array 648 is employed to further reduce the number of components and the size of the amplifier system. The remainder of the third embodiment is essentially similar to that described above for FIG. 5. The multiple port optical isolator includes four input optical pigtails, four output optical pigtails and at least one passive optical isolator between the input optical pigtails and output optical pigtails. Two of the four input optical pigtails are coupled to the optical fiber outputs of the first and second optical power amplifiers, and two of the four output optical pigtails are coupled to the optical fiber inputs of the first and second optical power amplifiers.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the embodiments described above may be used with multiple wavelength or WDM systems; with pump lasers or other pump light sources; with cooled or uncooled pump lasers; with various combinations of power amplifiers and pre-amplifiers; with multiple transmitters and/or multiple receivers; integrated with a optoelectronic transceiver or as a separate component therefrom; with optical isolators or without; with or without gain equalization filters; with or without logic functions in electronics; and with or without external controls for electronics.

What is claimed is:

1. A dual fiber optic amplifier comprising:
    a pump source that emits light;
    a pump splitter that splits the light emitted by the pump source into two or more portions, a first portion directed in a first direction and a second portion directed in a second direction;
    a first optical power amplifier having an optical fiber input, an optical fiber output, and a doped fiber portion, wherein the first portion of light emitted from the pump source is coupled into the optical fiber input of the first optical power amplifier; and a second optical power amplifier having an optical fiber input, an optical fiber output, and a doped fiber portion, wherein the second portion of light emitted from the pump source is coupled into the optical fiber input of the second optical power amplifier; and
    a dual path gain equalization filter coupled to both the optical fiber output of the first optical power amplifier and the optical fiber output of the second optical power amplifier.

2. A dual fiber optic amplifier according to claim 1, wherein the dual path gain equalization filter is configured, in combination with the first and second optical power amplifiers, to equalize optical power gain over a predefined range of optical wavelengths.

3. A dual fiber optic amplifier comprising:
    a pump source that emits light;
    a pump splitter that splits the light emitted by the pump source into two or more portions, a first portion directed in a first direction and a second portion directed in a second direction;
    a first optical power amplifier having an optical fiber input, an optical fiber output, and a doped fiber portion, wherein the first portion of light emitted from the pump source is coupled into the optical fiber input of the first optical power amplifier; and a second optical power amplifier having an optical fiber input, an optical fiber output, and a doped fiber portion, wherein the second portion of light emitted from the pump source is coupled into the optical fiber input of the second optical power amplifier;
    a first detector coupled to at least one of the optical fiber input and the optical fiber output of the first optical power amplifier;
    a second detector coupled to at least one of the optical fiber input and the optical fiber output of the second optical power amplifier; and
    logic circuitry coupled to the first and second detectors and the pump source, for controlling the pump source in accordance with optical signals detected by at least one of the first and second detectors, wherein the logic circuitry is configured to modulate operation of the pump source in accordance with optical signals detected by at least one of the first and second detectors.

4. A dual fiber optic amplifier comprising:
    a pump source that emits light;
    a pump splitter that splits the light emitted by the pump source into two or more portions, a first portion directed in a first direction and a second portion directed in a second direction;
    a first optical power amplifier having an optical fiber input, an optical fiber output, and a doped fiber portion, wherein the first portion of light emitted from the pump source is coupled into the optical fiber input of the first optical power amplifier; and a second optical power amplifier having an optical fiber input, an optical fiber output, and a doped fiber portion, wherein the second portion of light emitted from the pump source is coupled into the optical fiber input of the second optical power amplifier; and
    at least one optical component comprising at least two input optical pigtails, at least two output optical pigtails and a passive optical sub-component interposed between the input optical pigtails and output optical pigtails.

5. A dual fiber optic amplifier comprising:
a pump source that emits light;
a pump splitter that splits the light emitted by the pump source into two or more portions, a first portion directed in a first direction and a second portion directed in a second direction;
a first optical power amplifier having an optical fiber input, an optical fiber output, and a doped fiber portion, wherein the first portion of light emitted from the pump source is coupled into the optical fiber input of the first optical power amplifier; and a second optical power amplifier having an optical fiber input, an optical fiber output, and a doped fiber portion, wherein the second portion of light emitted from the pump source is coupled into the optical fiber input of the second optical power amplifier; and
a multiple port optical isolator, the multiple port optical isolator including four input optical pigtails, four output optical pigtails and at least one passive optical isolator between the input optical pigtails and output optical pigtails, wherein two of the four input optical pigtails are coupled to the optical fiber outputs of the first and second optical power amplifiers, and two of the four output optical pigtails are coupled to the optical fiber inputs of the first and second optical power amplifiers.

6. An optoelectronic transceiver, comprising:
an optical signal transmitter;
an optical signal receiver;
a pump source that emits light;
a pump splitter that splits the light emitted by the pump source into two or more portions, a first portion directed in a first direction and a second portion directed in a second direction;
a first optical power amplifier having an optical fiber input coupled to an output of the optical signal transmitter, an optical fiber output, and a doped fiber portion, wherein the first portion of light emitted from the pump source is coupled into the optical fiber input of the first optical power amplifier;
and a second optical power amplifier having an optical fiber input, an optical fiber output coupled to an input of the optical signal receiver, and a doped fiber portion, wherein the second portion of light emitted from the pump source is coupled into the optical fiber input of the second optical power amplifier.

7. The optoelectronic transceiver of claim 6, further comprising:
an electrical assembly having an electrical signal interface for receiving and transmitting first and second signal streams, respectively, the electrical assembly coupled to the optical signal transmitter and optical signal receiver for conveying and receiving the first and second signal streams, respectively.

8. The optoelectronic transceiver of claim 6, wherein the pump source is a laser.

9. The optoelectronic transceiver of claim 6, wherein the pump source emits light having a wavelength less than a wavelength of an optical signal being transmitted through the doped fiber amplifier.

10. The optoelectronic transceiver of claim 6, wherein the first portion of light emitted from the pump source is coupled into the optical fiber input of the first optical power amplifier by using a wave division multiplexing coupler.

11. The optoelectronic transceiver of claim 6, wherein the second portion light emitted from the pump source is coupled into the optical fiber input of the second optical power amplifier by using a wave division multiplexing coupler.

12. The optoelectronic transceiver of claim 6, wherein the doped fiber portion of the first optical amplifier is an erbium doped optical fiber.

13. The optoelectronic transceiver of claim 6, wherein the doped fiber portion of the second optical amplifier is an erbium doped optical fiber.

14. The optoelectronic transceiver of claim 6, wherein the pump splitter is configured to split the light emitted by the pump source into two or more portions having a predefined power amplitude ratio to each other.

15. The optoelectronic transceiver of claim 6, further comprising a gain equalization filter coupled to the optical fiber output of the first optical power amplifier.

16. The optoelectronic transceiver of claim 15, wherein the gain equalization filter is configured, in combination with the first optical power amplifier, to equalize optical power gain over a predefined range of optical wavelengths.

17. The optoelectronic transceiver of claim 6, further comprising a gain equalization filter coupled to the optical fiber output of the second optical power amplifier.

18. The optoelectronic transceiver of claim 17, wherein the gain equalization filter is configured, in combination with the second optical power amplifier, to equalize optical power gain over a predefined range of optical wavelengths.

19. The optoelectronic transceiver of claim 6, further including a dual path gain equalization filter coupled to both the optical fiber output of the first optical power amplifier and the optical fiber output of the second optical power amplifier.

20. The optoelectronic transceiver of claim 19, wherein the dual path gain equalization filter is configured, in combination with the first and second optical power amplifiers, to equalize optical power gain over a predefined range of optical wavelengths.

21. The optoelectronic transceiver of claim 6, further comprising:
a first detector coupled to at least one of the optical fiber input and the optical fiber output of the first optical power amplifier;
a second detector coupled to at least one of the optical fiber input and the optical fiber output of the second optical power amplifier;
and logic circuitry coupled to the first and second detectors and the pump source, for controlling the pump source in accordance with optical signals detected by at least one of the first and second detectors.

22. The optoelectronic transceiver of claim 21, wherein the logic circuitry is configured to enable operation of the pump source when the optical signals detected by at least one of the first and second detectors meet predefined criteria.

23. The optoelectronic transceiver of claim 21, wherein the logic circuitry is configured to enable operation of the pump source when the optical signals detected by both of the first and second detectors meet predefined criteria.

24. The optoelectronic transceiver of claim 21, wherein the logic circuitry is configured to modulate operation of the pump source in accordance with optical signals detected by at least one of the first and second detectors.

25. The optoelectronic transceiver of claim 6, including at least one optical component comprising at least two input optical pigtails, at least two output optical pigtails and a passive optical sub-component interposed between the input optical pigtails and output optical pigtails.

26. The optoelectronic transceiver of claim 6, further comprising a multiple port optical isolator, the multiple port optical isolator including four input optical pigtails, four output optical pigtails and at least one passive optical isolator between the input optical pigtails and output optical pigtails, wherein two of the four input optical pigtails are coupled to the optical fiber outputs of the first and second optical power amplifiers, and two of the four output optical pigtails are coupled to the optical fiber inputs of the first and second optical power amplifiers.

* * * * *

UNITED STATES PATENT AND TRADEMARK OFFICE
CERTIFICATE OF CORRECTION

PATENT NO. : 7,031,051 B2  Page 1 of 1
APPLICATION NO. : 10/384228
DATED : April 18, 2006
INVENTOR(S) : Liu et al.

It is certified that error appears in the above-identified patent and that said Letters Patent is hereby corrected as shown below:

<u>Column 4</u>
Line 23, before "optical", change "On" to --An--
Line 45, change "204" to --240--

<u>Column 7</u>
Line 26, change "coupled" to --coupler--

<u>Column 8</u>
Line 15, change "446" to --466--
Line 29, after "detectors", change "486" to --488--
Line 31, change "connection 484" to --connections 484 and 490--
Line 34, after "422", change "are" to --is--

Signed and Sealed this

Twenty-third Day of September, 2008

JON W. DUDAS
*Director of the United States Patent and Trademark Office*